United States Patent
Barker et al.

(10) Patent No.: US 11,125,098 B2
(45) Date of Patent: Sep. 21, 2021

(54) BLADE OUTER AIR SEAL WITH FACE SEAL

(71) Applicant: United Technologies Corporation, Farmington, CT (US)

(72) Inventors: William M. Barker, North Andover, MA (US); Thomas E. Clark, Sandford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 83 days.

(21) Appl. No.: 16/567,561

(22) Filed: Sep. 11, 2019

(65) Prior Publication Data

US 2021/0071542 A1    Mar. 11, 2021

(51) Int. Cl.
*F01D 11/08* (2006.01)
*F02C 7/28* (2006.01)

(52) U.S. Cl.
CPC .............. *F01D 11/08* (2013.01); *F02C 7/28* (2013.01); *F05D 2240/55* (2013.01); *F05D 2300/20* (2013.01)

(58) Field of Classification Search
CPC .......... F01D 11/00; F01D 11/08; F01D 25/24; F01D 25/246; F01D 9/04; F05D 2240/11; F05D 2240/55; F05D 2260/30; F05D 2309/6033
See application file for complete search history.

(56) References Cited

U.S. PATENT DOCUMENTS

| | | |
|---|---|---|
| 6,609,886 B2 | 8/2003 | Aksit et al. |
| 6,659,472 B2 | 12/2003 | Aksit et al. |
| 6,997,673 B2 | 2/2006 | Morris et al. |
| 9,945,256 B2 | 4/2018 | Freeman et al. |
| 10,240,467 B2 | 3/2019 | Tatman et al. |
| 2017/0089211 A1 | 3/2017 | Broomer et al. |
| 2017/0268364 A1* | 9/2017 | McCaffrey ............ F01D 5/284 |
| 2018/0238193 A1* | 8/2018 | Baucco ................ F01D 11/005 |
| 2019/0153886 A1 | 5/2019 | Vetters et al. |

FOREIGN PATENT DOCUMENTS

| | | |
|---|---|---|
| EP | 3219924 | 9/2017 |
| EP | 3366892 | 8/2018 |

OTHER PUBLICATIONS

Partial European Search Report for European Patent Application No. 20194466.7 completed Oct. 20, 2020.
European Search Report for European Application No. 20194466.7 completed Oct. 20, 2020.

* cited by examiner

*Primary Examiner* — Igor Kershteyn
(74) *Attorney, Agent, or Firm* — Carlson, Gaskey & Olds, P.C.

(57) ABSTRACT

A blade outer air seal includes a carrier, a ceramic seal segment, and a face seal. The ceramic seal segment is supported on the carrier and has first and second axial ends, first and second circumferential sides, an inner side, and an outer side. The face seal is carried on the ceramic seal segment at the first axial end. The face seal has a radial seal wall and a tongue that extends axially from the radial seal wall.

19 Claims, 6 Drawing Sheets

BLADE OUTER AIR SEAL WITH FACE SEAL

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The compressor section can include rotors that carry airfoils to compress the air entering the compressor section. A shaft may be coupled to the rotors to rotate the airfoils.

SUMMARY

A blade outer air seal according to an example of the present disclosure includes a carrier and a ceramic seal segment supported on the carrier. The ceramic seal segment has first and second axial ends, first and second circumferential sides, an inner side, and an outer side. A face seal is carried on the ceramic seal segment at the first axial end. The face seal has a radial seal wall and a tongue extending axially from the radial seal wall.

In a further embodiment of any of the foregoing embodiments, the face seal is coextensive with the first axial end of the ceramic seal segment.

In a further embodiment of any of the foregoing embodiments, the tongue is non-coextensive with the radial seal wall.

In a further embodiment of any of the foregoing embodiments, the tongue is carried on the outer side of the ceramic seal segment.

In a further embodiment of any of the foregoing embodiments, the first axial end of the ceramic seal segment includes an axial slot, and the tongue extends into the axial slot.

In a further embodiment of any of the foregoing embodiments, the face seal is spring-loaded.

In a further embodiment of any of the foregoing embodiments, the ceramic seal segment includes first and second inward-facing dovetail hooks that project from the outer side, and the tongue extends between the first and second inward-facing dovetail hooks.

A further embodiment of any of the foregoing embodiments includes an inter-segment seal arranged along one of the first and second circumferential sides of the ceramic seal segment, wherein the carrier includes an axial stop, and the axial stop and the face seal limit axial movement of the inter-segment seal.

In a further embodiment of any of the foregoing embodiments, the radial seal wall includes a retainer arm adjacent the tongue, and the retainer arm limits axial movement of the inter-segment seal.

In a further embodiment of any of the foregoing embodiments, the ceramic seal segment is axially receivable onto the carrier.

A blade outer air seal according to an example of the present disclosure includes a carrier and a ceramic seal segment supported on the carrier. The ceramic seal segment has first and second axial ends, first and second circumferential sides, an inner side, and an outer side. The ceramic seal segment is axially receivable onto the carrier. A face seal is carried on the ceramic seal segment at the first axial end, and an inter-segment seal is arranged along one of the first and second circumferential sides. The face seal limits axial movement of the inter-segment seal.

In a further embodiment of any of the foregoing embodiments, the carrier includes an axial stop opposite the face seal, wherein the face seal and the axial stop limit axial movement of the inter-segment seal.

In a further embodiment of any of the foregoing embodiments, the face seal includes a radial seal wall that has an axially-facing surface, and a tongue that projects axially from the radial seal wall. The radial seal wall includes a retainer arm adjacent the tongue, and the retainer arm limits axial movement of the inter-segment seal.

In a further embodiment of any of the foregoing embodiments, the first axial end of the ceramic seal segment includes an axial slot, and the tongue extends into the axial slot.

In a further embodiment of any of the foregoing embodiments, the tongue is non-coextensive with the radial seal wall.

In a further embodiment of any of the foregoing embodiments, the radial seal wall is coextensive with the first axial end of the ceramic seal segment.

In a further embodiment of any of the foregoing embodiments, the ceramic seal segment includes first and second inward-facing dovetail hooks that project from the outer side, and the tongue is carried on the outer side of the ceramic seal segment and extends between the first and second inward-facing dovetail hooks.

A gas turbine engine according to an example of the present disclosure includes a compressor section, a combustor in fluid communication with the compressor section, and a turbine section in fluid communication with the combustor. The turbine section has a plurality of blade outer air seals. Each blade outer air seal includes a carrier and a ceramic seal segment supported on the carrier. The ceramic seal segment has first and second axial ends, first and second circumferential sides, an inner side, and an outer side, and a face seal carried on the ceramic seal segment at the first axial end. The face seal has a radial seal wall and a tongue that extends axially from the radial seal wall.

In a further embodiment of any of the foregoing embodiments, the face seal is coextensive with the first axial end of the ceramic seal segment.

In a further embodiment of any of the foregoing embodiments, the tongue is carried on the outer side of the ceramic seal segment and extends between first and second inward-facing dovetail hooks of the ceramic seal segment.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
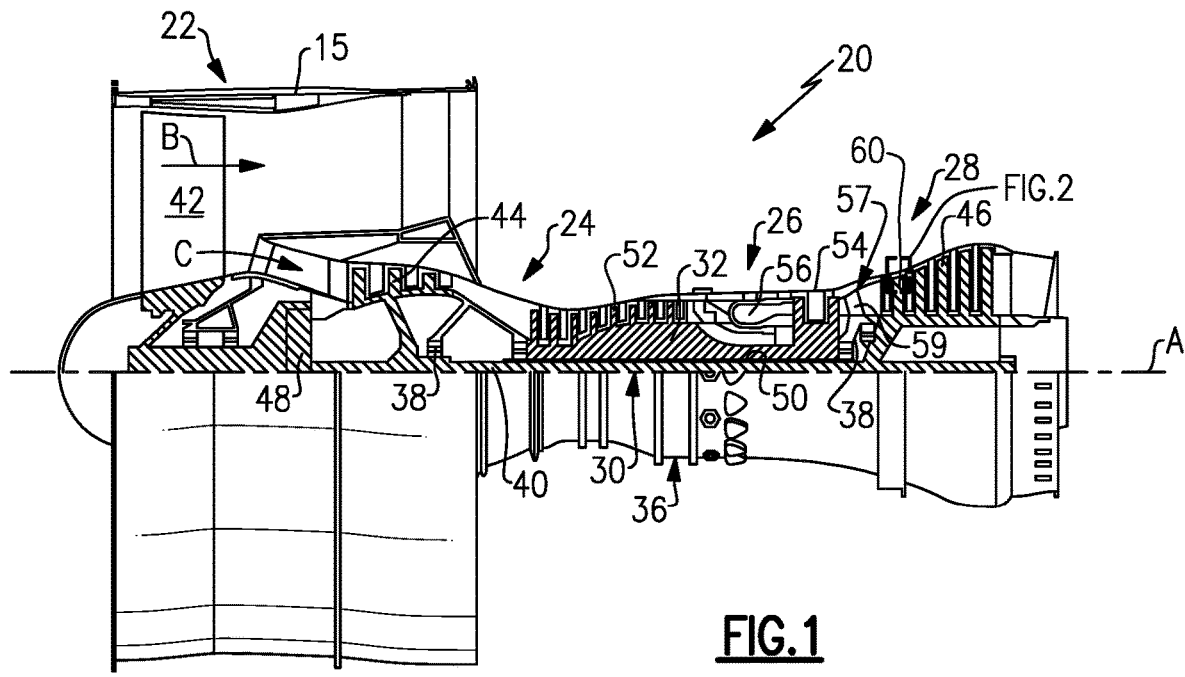
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
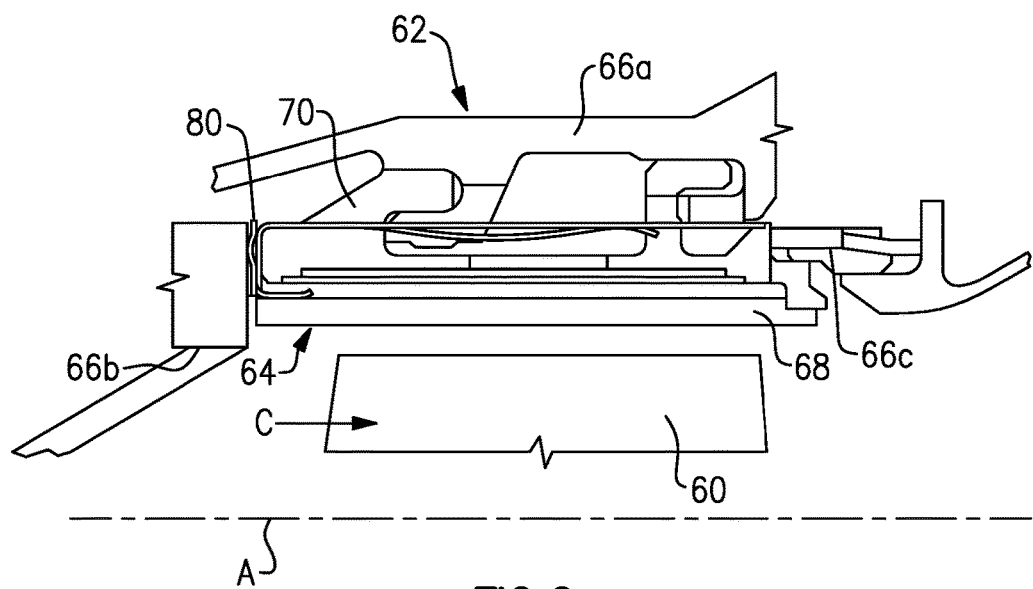
FIG. 2 illustrates the turbine section of the engine.

FIG. 2 illustrates a sectioned view from the turbine section 28. The turbine section 28 includes a row of turbine blades 60 that are rotatable in the core flow path C. A seal system 62 is arranged generally radially outwards of the tips of the blades 60. The seal system 62 includes a circumferential row of blade outer air seals 64 ("seals 64"). The tips of the blades 60 are in close proximity to the seals 64 to reduce gas flow around the tips. The seals 64 are mounted to a surrounding case 66a or other structure. In the example shown, the seals 64 are located axially between a forward structure 66b, such as but not limited to a vane structure, and an aft structure 66c, such as but not limited to a seal structure. And while the seal system 62 is shown in location in the turbine section 28, it is to be understood that the examples herein are not limited to that location.

Each seal 64 comprises a ceramic seal segment 68 and a carrier 70. The ceramic seal segment 68 may serve to maintain tip clearance, resist pressure gradients, seal secondary flow paths off of the core flow path C, and/or protect other structures from the high temperatures in the core flow path C. The carrier 70 serves to attach the ceramic seal segment 68 to the case 66a or other structure.

Figure 3A:
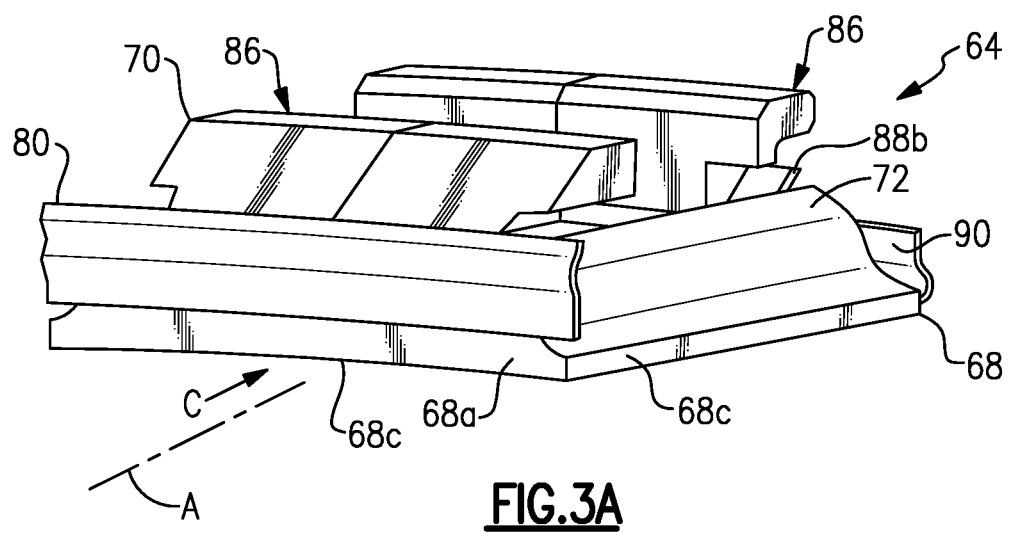
FIG. 3A illustrates an isolated view of a blade outer air seal.
Figure 3B:
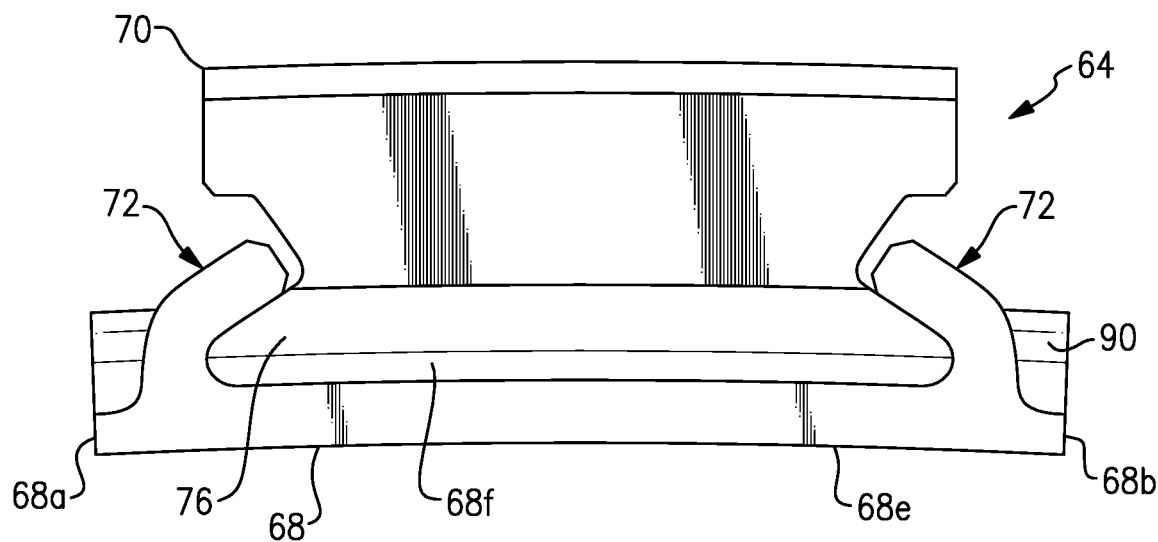
FIG. 3B illustrates a sectioned view of the blade outer air seal.
Figure 4:
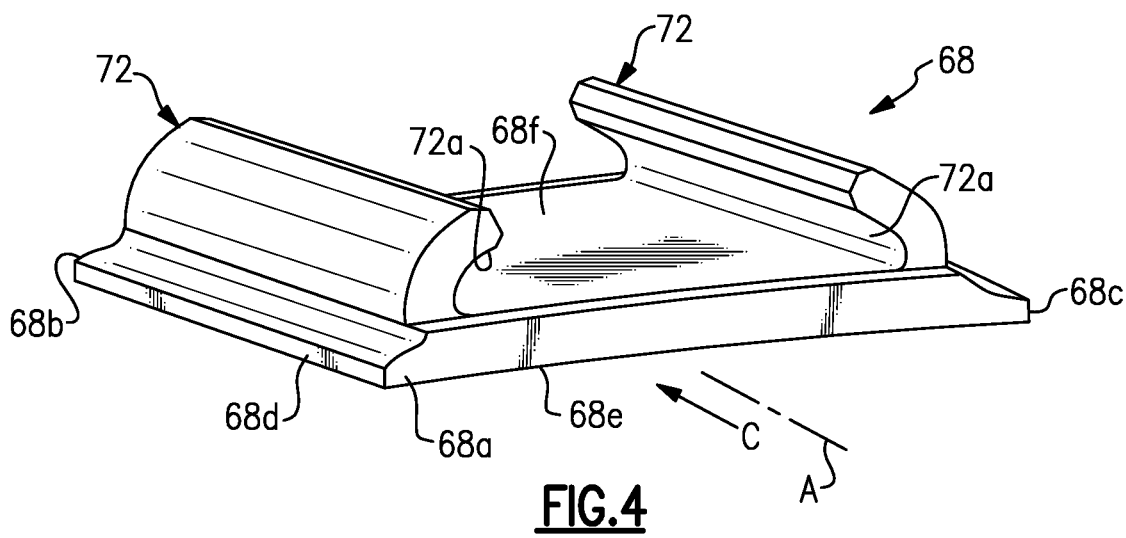
FIG. 4 illustrates an isolated view of a ceramic seal segment of the blade outer air seal.
Figure 5:
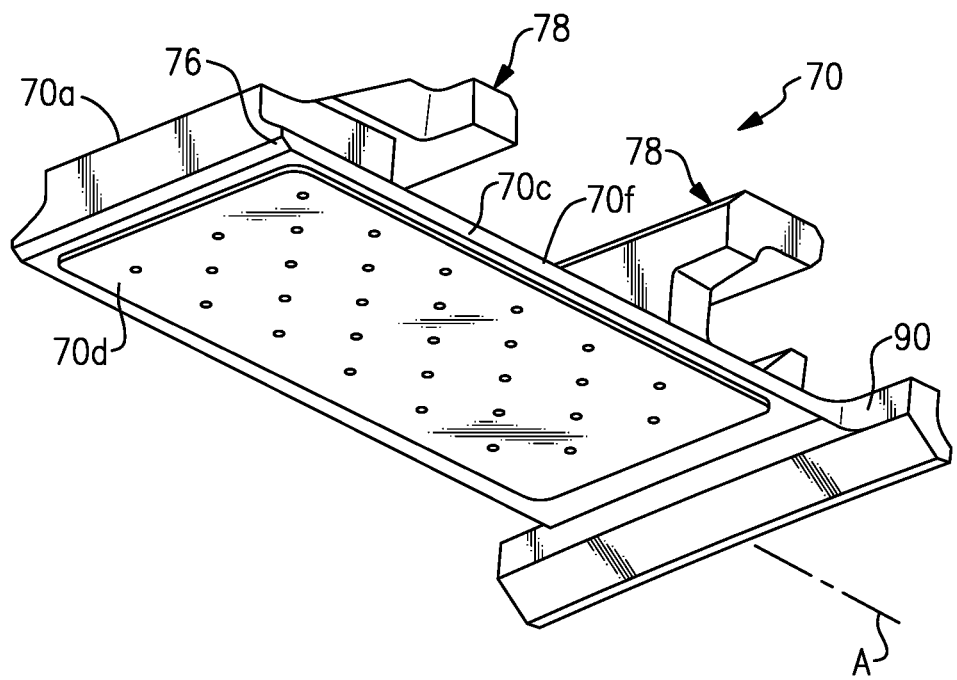
FIG. 5 illustrates an isolated view of a carrier of the blade outer air seal.

FIG. 3A shows an isolated view of the seal 64 and FIG. 3B illustrates a radially sectioned view of the seal 64. The ceramic seal segment 68 is also shown in an isolated view in FIG. 4, and the carrier 70 is shown in an isolated view in FIG. 5. Referring to these figures, the ceramic seal segment 68 has first and second axial ends 68a/68b, first and second circumferential sides 68c/68d, an inner side 68e, an outer side 68f, and first and second inward-facing dovetail hooks 72 that project from the outer side 68f. The first axial end 68a is a forward end in the illustrated examples, and the second end 68b is an aft end. The inward-facing dovetail hooks 72 are generally axially elongated and run along the respective circumferential sides 68c/68d.

Terms such as "axial," "radial," "circumferential," and variations of these terms are made with reference to the engine central axis A. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The ceramic seal segment 68 is formed of ceramic material. For instance, the ceramic material is a monolithic ceramic or a ceramic matrix composite. The monolithic ceramic may be a silicon-containing ceramic, such as but are not limited to, silicon carbide (SiC) or silicon nitride ($Si_3N_4$). The ceramic matrix composite may be, but is not limited to, SiC/SiC ceramic matrix composite in which SiC fibers are disposed within a SiC matrix. The ceramic matrix composite may be formed from fibrous plies that are stacked together and consolidated with the matrix.

The carrier 70 generally includes first and second axial carrier ends 70a/70b, first and second circumferential carrier sides 70c/70d, an inner carrier side 70e that faces toward the ceramic seal segment 68, and an outer carrier side 70f that faces away from the ceramic seal segment 68. The carrier 70 may be formed of a metallic alloy. Example alloys may include, but are not limited to, Ni and Co-based superalloys. Where noted, these alloys may also be used for other components described herein.

The carrier 70 includes a dovetail 76 for attaching the ceramic seal segment 68. The dovetail 76 is generally elongated in the axial direction. The ceramic seal segment 68 is received axially onto the dovetail 76, which radially supports the ceramic seal segment 68. Attachment features 78 on the carrier 70 serve to attach the carrier 70 to the case 66a or other structure. In the illustrated example, the features 78 are hooks that project from the outer carrier side 70f, although it is to be understood that the features 78 are not limited to hooks. Furthermore, neither the ceramic seal segment 68 nor the carrier 70 are limited to the exact designs shown and described herein, and the designs may vary in other implementations of this disclosure.

Figure 6:
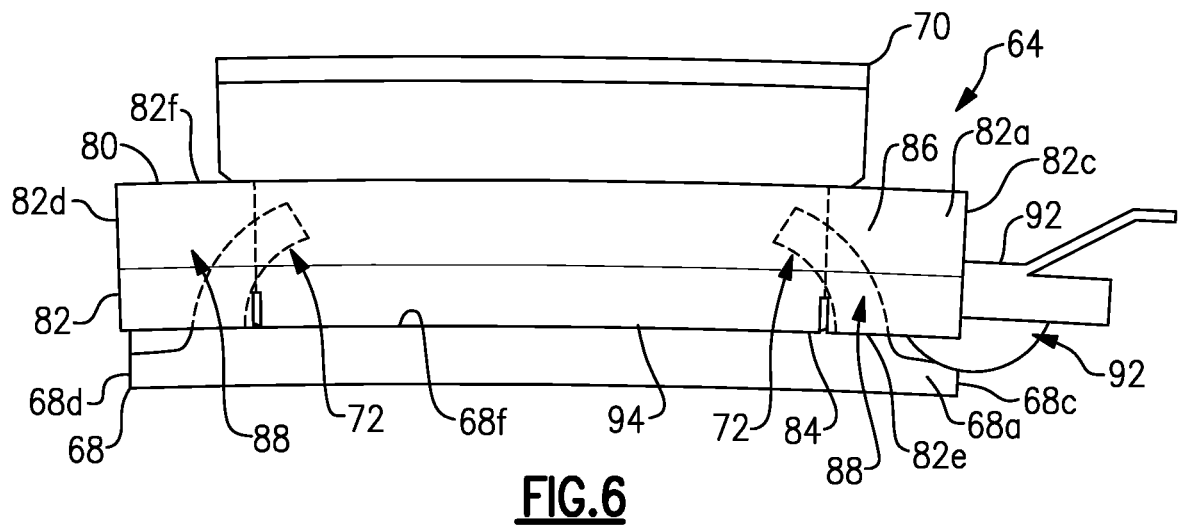
FIG. 6 illustrates an axial view of a blade outer air seal and face seal.
Figure 7:
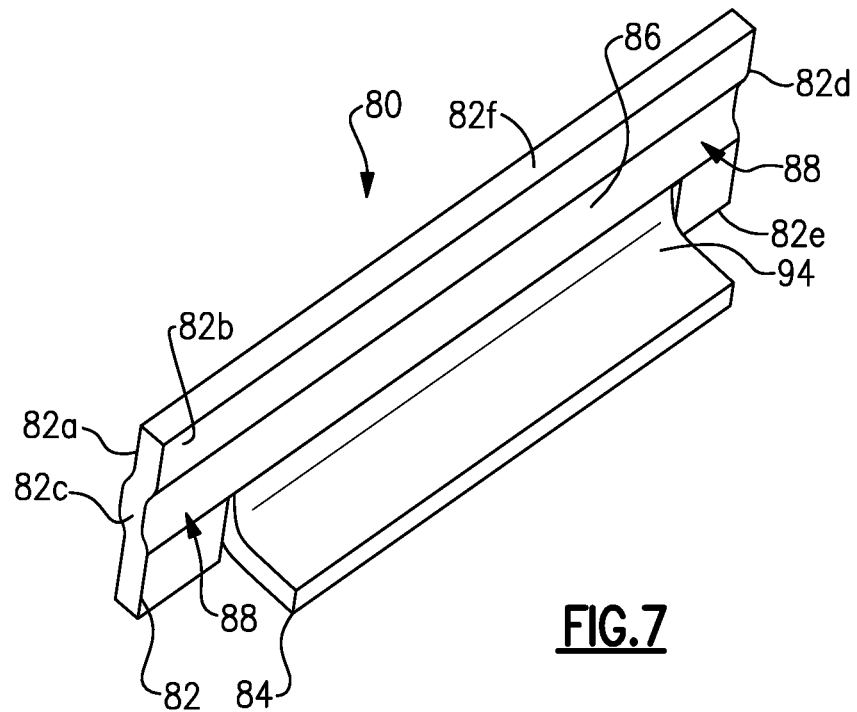
FIG. 7 illustrates an isolated view of the face seal.

FIG. 6 illustrates an axially aft-looking view of the seal 64. The seal 64 carries a face seal 80 at its forward end. FIG. 7 illustrates an isolated view of the face seal 80. The face seal 80 may be formed of a metallic alloy, such as but not limited to the alloys described elsewhere herein. The face seal 80 includes several different functional sections, including a radial seal wall 82 and a tongue 84. The radial seal wall 82 generally serves for sealing, and the face seal 80 is carried on the ceramic seal segment 68 by the tongue 84. The tongue 84 may also provide axial sealing.

Figure 8:
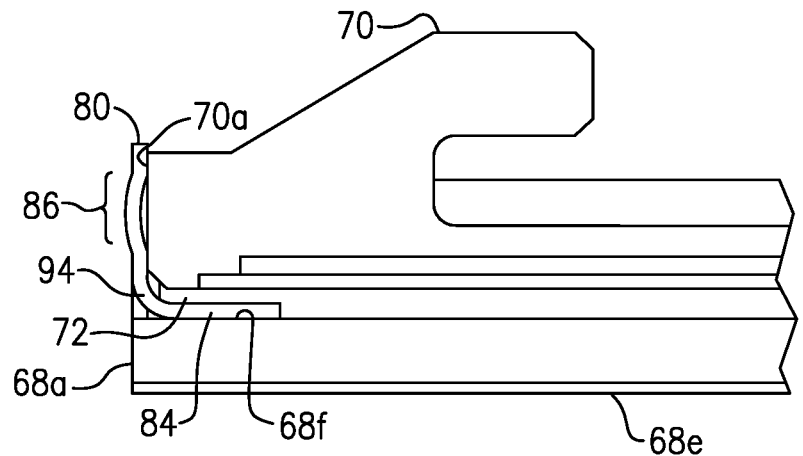
FIG. 8 illustrates a sectioned view of the blade outer air seal of FIG. 6.

The radial seal wall 82 defines first and second axial sides or surfaces 82a/82b, first and second circumferential ends 82c/82d, and inner and outer sides 82e/82f. The first axial side 82a serves as a seal or bearing surface against the forward structure 66b (FIG. 2), to limit gas flow radially between the structure 66b and the seal 64. In this regard, the radial seal wall 82 may include a ridge 86 to facilitate sealing. The ridge 86 may also serve to stiffen the face seal 80. The second axial side 82b also serves as a seal or bearing surface against the first axial carrier end 70a, as shown in FIG. 8.

The radial seal wall 82 is coextensive with the first axial side 68a of the ceramic seal segment 68, to provide sealing entirely across the circumferential extent of the segment 68. In that regard, the circumferential ends 82c/82d of the radial seal wall 82 are flush or substantially flush with the circumferential sides 68c/68d of the ceramic seal segment 68. For instance, the circumferential ends 82c/82d of the radial seal wall 82 are flush with the circumferential sides 68c/68d of the ceramic seal segment 68 within +/−1.3 millimeters.

Figure 9:
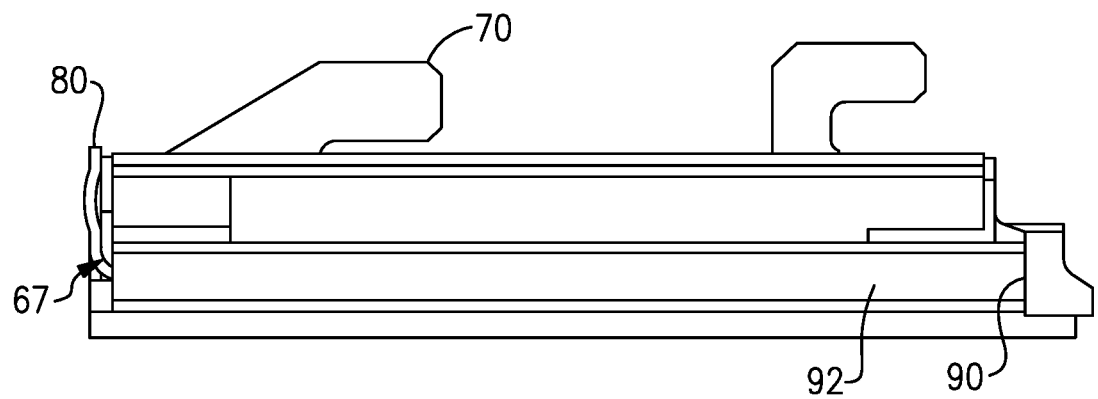
FIG. 9 illustrates an inter-segment seal between the face seal and an axial stop of the carrier.

The radial seal wall 82 also includes first and second retainer arms 88 (FIG. 6). The retainer arms 88 are the sections of the radial seal wall 82 that circumferentially flank the tongue 84. As shown in FIG. 9, the retainer arm 88 is axially opposite an axial stop 90 of the carrier 70. The retainer arm 88 limits axial movement of an inter-segment seal 92 and may axially mechanically trap the inter-segment seal 92 with the axial stop 90. The mechanical trapping may be periodic. For instance, when the engine 20 is in operation the inter-segment seal 92 may be subjected to a pressure differential that tends to shift the seal 92 aft. However, absent the pressure differential (e.g., in an engine off state), the retainer arm 88 mechanically traps the seal 92. It is to be appreciated that the example is non-limiting and that the conditions of a particular design may vary such that mechanical trapping occurs during other periods. In any case, the retainer arm 88 acts as a forward axial stop to limit the forward movement of the seal 92.

The tongue 84 projects axially from the radial seal wall 82 but is circumferentially non-coextensive with the radial seal wall 82. That is, the tongue 84 is located intermediate of the circumferential ends 82c/82d, between the retainer arms 88. The tongue 84 serves as a tang by which the face seal 80 is carried on the ceramic seal segment 68. Referring to FIGS. 6 and 8, the tongue 84 is carried on the outer side 68f and, in this example, extends between the hooks 72 of the ceramic seal segment 68. For instance, the tongue 84 may be in contact with the outer side 68f.

The face seal 80 includes a bend 94 between the radial seal wall 82 and the tongue 84. The bend 94 may serve as a spring such that the face seal 80 is spring-loaded. For instance, the bend 94 may be configured such that the tongue 84 is sloped radially inwards. When the radial seal wall 82 is trapped between the structure 66b and the first axial end 68a of the ceramic seal segment 68, the spring effect of the bend 94 biases the tongue 84 toward the outer side 68f of the segment 68, which may facilitate sealing an axial path.

Although not limited, the face seal 80 may be formed from sheet metal. For instance, the tongue 84 is cut or stamped, and bent into the desired configuration. Other manufacturing process may also be viable, such as but not limited to additive manufacturing and casting.

Figure 10:
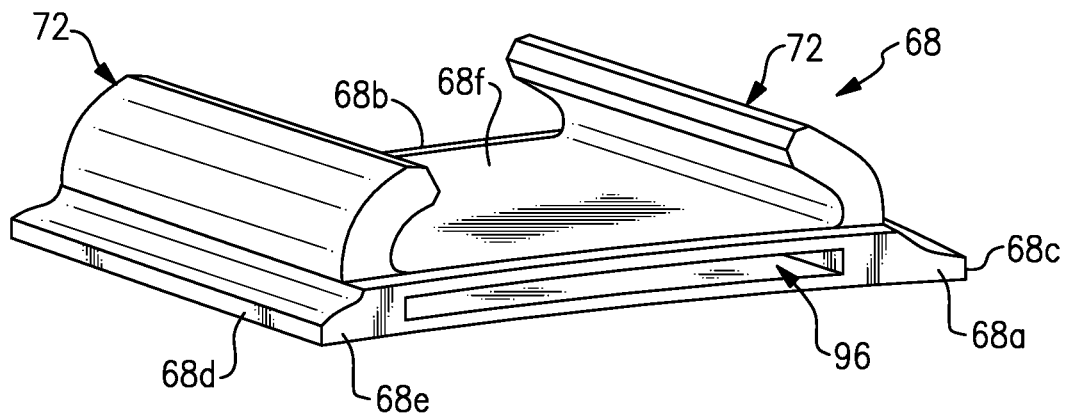
FIG. 10 illustrates a modified ceramic seal segment that includes an axial slot for carrying the face seal.
Figure 11:
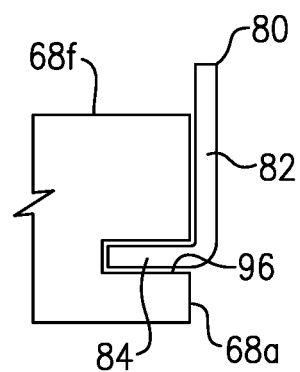
FIG. 11 illustrates a sectioned view of the tongue of the face seal extending into the axial slot.

FIG. 10 illustrates a modified example of the ceramic seal segment 68. In this example, the ceramic seal segment 68 includes an axial slot 96 for carrying the tongue 84 of the face seal 80. For instance, as shown in the sectioned view in FIG. 11, the tongue 84 extends into the axial slot 96 rather than being carried on the outer side 68f.

In the assembly of the engine 20 the face seal 80 is compressed between the seal 64 and the forward structure 66b. The radial seal wall 82 provides sealing at the leading end of the seal 64 by limiting radial flow from the core gas path in the region between the seal 64 and the structure 66b, while the tongue 84 may serve to limit axial leakage. Additionally, if an implementation uses inter-segment seals 92, the face seal 80 may serve to facilitate retaining the inter-segment seals 92. Although not limited to use with ceramic seal segments that utilize the hooks 72, the face seal 80 is configured to be compatible with the use of the hooks 72. The presence of hooks or other attachment features on the outer side 68f of the ceramic seal segment 68 can hinder placement of sealing mechanisms in those regions. The face seal 80, however, has the tongue 84 that may extend between the hooks 72 to carry the face seal 80. Although the circumferential extent of the tongue 84 is relatively short, the radial seal wall 82 is relatively longer in circumferential extent. The radial seal wall 82 can thereby provide sealing across the full circumferential extent, while the tongue 84, although shorter, serves to facilitate the carrying of the face seal 80.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A blade outer air seal comprising:
   a carrier;
   a ceramic seal segment supported on the carrier, the ceramic seal segment having first and second axial ends, first and second circumferential sides, an inner side, an outer side, and first and second inward-facing dovetail hooks that project from the outer side; and
   a face seal carried on the ceramic seal segment at the first axial end, the face seal having a radial seal wall and a tongue extending axially from the radial seal wall and between the first and second inward-facing dovetail hooks.

2. The blade outer air seal as recited in claim 1, wherein the face seal is coextensive with the first axial end of the ceramic seal segment.

3. The blade outer air seal as recited in claim 2, wherein the tongue is non-coextensive with the radial seal wall.

4. The blade outer air seal as recited in claim 1, wherein the tongue is carried on the outer side of the ceramic seal segment.

5. The blade outer air seal as recited in claim 1, wherein the first axial end of the ceramic seal segment includes an axial slot, and the tongue extends into the axial slot.

6. The blade outer air seal as recited in claim 1, wherein the face seal is spring-loaded.

7. The blade outer air seal as recited in claim 1, further comprising an inter-segment seal arranged along one of the first and second circumferential sides of the ceramic seal segment, wherein the carrier includes an axial stop, and the axial stop and the face seal limit axial movement of the inter-segment seal.

8. The blade outer air seal as recited in claim 7, wherein the radial seal wall includes a retainer arm adjacent the tongue, and the retainer arm limits axial movement of the inter-segment seal.

9. The blade outer air seal as recited in claim 1, wherein the ceramic seal segment is axially receivable onto the carrier.

10. A blade outer air seal comprising:
    a carrier;
    a ceramic seal segment supported on the carrier, the ceramic seal segment having first and second axial ends, first and second circumferential sides, an inner side, and an outer side, the ceramic seal segment being axially receivable onto the carrier;
    a face seal carried on the ceramic seal segment at the first axial end; and
    an inter-segment seal arranged along one of the first and second circumferential sides, the face seal limiting axial movement of the inter-segment seal.

11. The blade outer air seal as recited in claim 10, wherein the carrier includes an axial stop opposite the face seal, wherein the face seal and the axial stop limit axial movement of the inter-segment seal.

12. The blade outer air seal as recited in claim 10, wherein the face seal includes a radial seal wall that has an axially-facing surface, a tongue that projects axially from the radial seal wall, the radial seal wall includes a retainer arm adjacent the tongue, and the retainer arm limits axial movement of the inter-segment seal.

13. The blade outer air seal as recited in claim 12, wherein the first axial end of the ceramic seal segment includes an axial slot, and the tongue extends into the axial slot.

14. The blade outer air seal as recited in claim 12, wherein the tongue is non-coextensive with the radial seal wall.

15. The blade outer air seal as recited in claim 14, wherein the radial seal wall is coextensive with the first axial end of the ceramic seal segment.

16. The blade outer air seal as recited in claim 12, wherein the ceramic seal segment includes first and second inward-facing dovetail hooks that project from the outer side, and the tongue is carried on the outer side of the ceramic seal segment and extends between the first and second inward-facing dovetail hooks.

17. A gas turbine engine comprising:
    a compressor section;
    a combustor in fluid communication with the compressor section; and
    a turbine section in fluid communication with the combustor,
    the turbine section including a plurality of blade outer air seals, each said blade outer air seal comprising:
    a carrier,
    a ceramic seal segment supported on the carrier, the ceramic seal segment having first and second axial ends, first and second circumferential sides, a radially inner side, and a radially outer side, and
    a face seal carried on the ceramic seal segment at the first axial end, the face seal having a radial seal wall and a tongue extending axially from the radial seal wall the tongue being radially trapped between the carrier and the radially outer side of the ceramic seal segment.

18. The engine as recited in claim 17, wherein the face seal is coextensive with the first axial end of the ceramic seal segment.

19. The engine as recited in claim 18, wherein the tongue extends between first and second inward-facing dovetail hooks of the ceramic seal segment.

\* \* \* \* \*